United States Patent [19]

Breglia et al.

[11] 4,446,480
[45] May 1, 1984

[54] HEAD POSITION AND ORIENTATION SENSOR

[75] Inventors: Denis R. Breglia, Altamonte Springs; Frank J. Oharek, Maitland, both of Fla.

[73] Assignee: The United States of America as represented by the Secretary of the Navy, Washington, D.C.

[21] Appl. No.: 330,756

[22] Filed: Dec. 14, 1981

[51] Int. Cl.³ .................................................. H04M 7/18
[52] U.S. Cl. ..................................... 358/104; 358/237; 434/22; 434/40; 434/44; 364/449; 364/559
[58] Field of Search .................. 358/93, 104, 103, 109, 358/231, 237; 434/22, 40, 44; 364/174, 175, 449, 559

[56] References Cited

U.S. PATENT DOCUMENTS

| | | | |
|---|---|---|---|
| 3,205,303 | 9/1965 | Bradley | 358/210 |
| 3,670,426 | 8/1970 | Horowitz | 434/43 |
| 3,784,742 | 1/1974 | Burnham et al. | 358/104 |
| 3,892,051 | 7/1975 | Bunker | 434/104 |
| 4,027,403 | 6/1977 | Marsh et al. | 358/903 |
| 4,048,653 | 9/1977 | Spooner | 358/104 |
| 4,085,425 | 4/1978 | Hamill | 358/231 |
| 4,103,435 | 8/1978 | Herndon | 434/43 |
| 4,164,081 | 8/1979 | Berke | 434/22 |
| 4,177,579 | 12/1979 | Peters | 358/104 |
| 4,209,255 | 6/1980 | Heynau | 358/93 |

*Primary Examiner*—Tommy P. Chin
*Assistant Examiner*—Edward L. Coles
*Attorney, Agent, or Firm*—Robert F. Beers; Robert W. Adams; Robert J. Veal

[57] ABSTRACT

A head position and orientation sensor system utilizes a head mounted projector of known scan pattern which presents a visual display to the observer. In order to maintain proper display orientation, the head position and orientation are measured by intercepting the projected light scan pattern at a retroreflective screen upon which the visual display is focused. A photodetector array mounted in said screen intercepts the visual display regardless of head orientation and position. A computational unit having knowledge of the scan pattern parameters correlates the photodetector array output to a unique head position and orientation.

10 Claims, 1 Drawing Figure

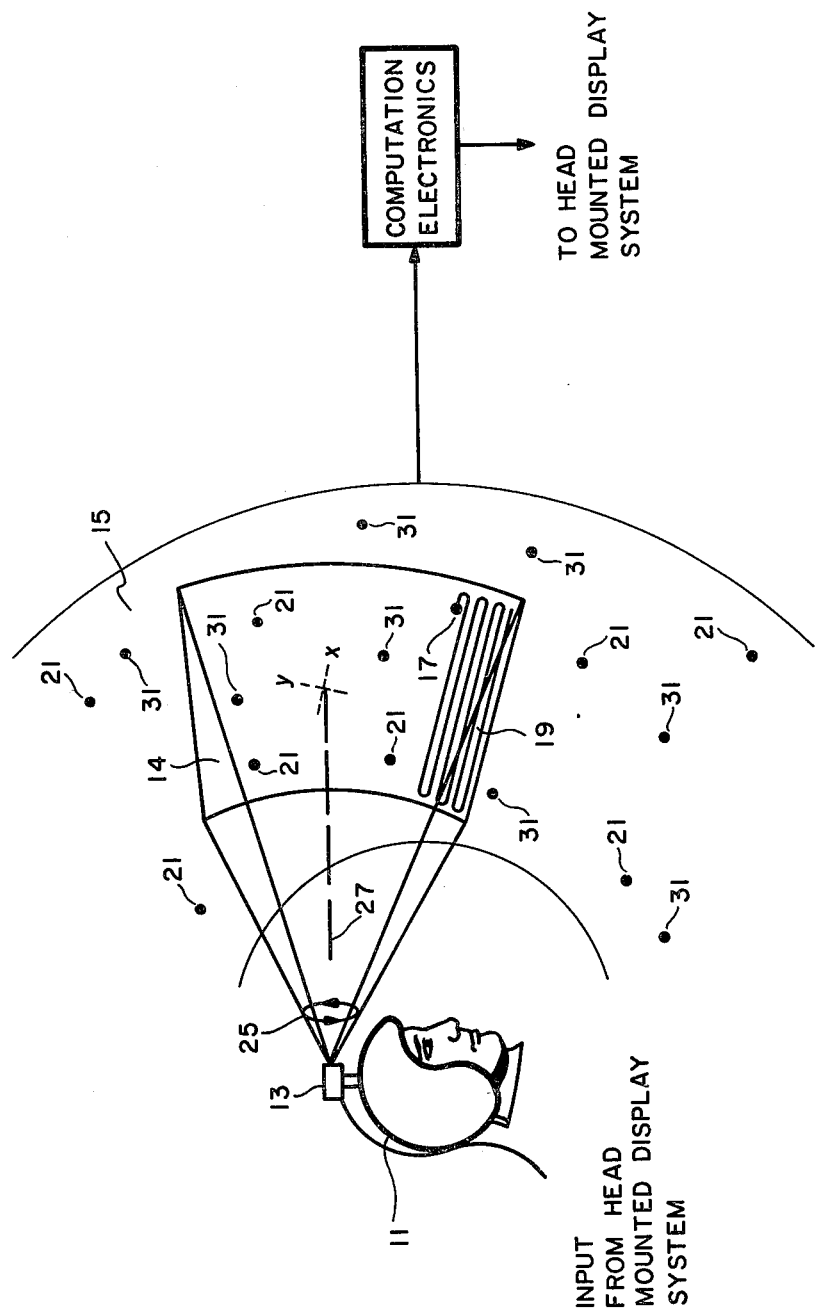

HEAD POSITION AND ORIENTATION SENSOR

FIELD OF THE INVENTION

This invention relates to visual display apparatus and particularly to apparatus for providing a visual display to an observer such as a view seen from an aircraft. More particularly, the invention relates to the determination of head orientation with respect to such a display. In even greater particularity, the invention may be described as a head position and orientation sensor utilizing optical coupling between a head mounted projector and a plurality of photodetectors in a projection screen.

DESCRIPTION OF THE PRIOR ART

A number of methods have been devised to allow the measurement of head position in a simulation system. Many of these require a mechanical linkage to the head, such as in U.S. Pat. No. 4,048,653 to Archer Michael Spooner. Such systems may suffer disadvantages of added weight and rotational inertia, and thereby unnaturally restrict the sense of head movement.

Other systems utilize an electromagnetic transmitter/receiver method to monitor head position and orientation. Such a system has a sensitivity to moving metal in the electromagnetic field which causes loss of precision in measurements and difficulties in calibration.

Point light sources and arrays of point light sources have been proposed for use in sensing devices, but these require high angular accuracy in the detector array.

SUMMARY OF THE INVENTION

Some of the disadvantages of the prior art are overcome by the innovation of the present invention. Particularly there is no mechanical linkage for measuring head position or any electromagnetic field measurement apparatus.

The present invention utilizes an array of photodetectors imbedded in a projection screen outputting signals to a computational electronics unit which can determine the position and orientation of a projection unit mounted on an observer's head. The computational unit must know the raster characteristics of the projector and be able to correlate the sensed raster position from the photodetector with the raster spot two dimensional angular position and timing characteristics to compute the position and orientation of the projector.

OBJECTS OF THE INVENTION

It is an object of this invention to provide a means for determining the position and orientation of an observer's head in a visual simulation system. It is a further object of the invention to make the above determination without any mechanical or electromagnetic linkage to the user's head.

Yet another object of the invention is the simultaneous determination of a plurality of positions for a plurality of observer's head locations.

These and other objects, advantages and new features will become apparent from a study of the following description and the drawing.

DESCRIPTION OF THE DRAWING

The drawing is a representation of the present invention.

DESCRIPTION OF A PREFERRED EMBODIMENT

In order for a visual simulation display to provide a realistic visual scene to an observer, such as a pilot trainee, the orientation and position of the observer's head must not result in a disruption of the display. The obvious solution is to orient the display in accordance with the observer's head. This, however, requires a dynamic response to changes in the head position so as to present a visual display properly oriented at all times. The dynamic response requires a constant and accurate monitoring of the head position with feedback to an image generating source to effect changes in the image.

It is highly desirable that the observer have as much freedom of movement as possible within the constraints of the system being simulated. Monitoring of the head position should interfere only minimally with the head motion.

The present invention accomplishes these goals in the following manner, the understanding of which may be facilitated by reference to the FIGURE.

A helmet 11, similar to that of a crew member in the craft simulated, is worn on an observer's head. Mounted atop helmet 11 is a projector 13. Projector 13 is of a type which projects a visual scene display 14 on a spherical retroreflective screen 15 by moving a spot of light called a raster spot 17 in a predetermined pattern known as a raster scan pattern 19. The projected display can be of any known regular scan pattern constrained only by the requirement that the angular position of raster spot 17 can be determined temporally from the synchronization pulses of scan pattern 19.

The preferred embodiment of the invention assumes a rectangular raster scan pattern similar to that used in television, such that the position of raster spot 17 can be determined at any time from the raster line number as counted from the termporal beginning of a raster frame, a raster frame being a field of raster lines generated by moving raster spot 17 through its predetermined course. The temporal beginning of a raster frame is the field synchronization pulse. The second rectangular coordinate of the position of raster spot 17 is determined by the length of time from the temporal beginning of the determined raster line which occurs at the line synchronization pulse.

Imbedded in retroreflective screen 15 are small photodetectors 21, preferably photodiodes having a response time in the 100 mhz or better range. When raster spot 17 passes over one of photodetectors 21, the photodetector generates an electrical pulse to a computational electronic unit 23. The time that the electrical pulse is generated provides two pieces of information; namely, the raster line, and distance along that line raster spot 17 had traveled when it intercepted photodetector 21.

Computational electronics unit 23 must be programmed with the knowledge of the type raster scan used in order to determine raster spot location on the basis of photodetector excitation time. Since, from geometry, there are six pieces of information necessary to uniquely determine head position and orientation, a total of three photodetector 21 excitations within a single raster frame are the minimum necessary to supply the computational information.

In the preferred embodiment, the visual scene display 14 projected in a single raster frame fills a solid angle 25 which is substantially smaller than screen 15. The number and distribution of photodetectors 21 must be such that three or more photodetectors 21 are within the visual scene display 14 for any possible head location and orientation.

The parameters of photodetectors 21 are such that they are capable of excitation during the display temporal band-width. The active area of photodetectors 21 determines the accuracy to which the raster position on the screen can be measured. In the preferred embodiment this is determined by mounting the photodetectors 21 behind holes in screen 15. The size of the hole is approximately equal to the visual scene display 14 resolution capability, e.g., about 5 mm for a screen radius of three meters.

Computational electronics unit 23, designed in accordance with the teaching of U.S. Pat. No. 4,164,081 issued to Herbert Berke and including a computer, and will output head position and orientation signals to a pilot helmet mounted display system to generate a visual presentation conforming to said position and attitude. The inputs from three photodetectors 21 excited in a single raster frame yield three positions of the raster spot 17 with respect to the projection axis 27 of raster projector 13. The excitation of each photodetector 21 is correlated with its physical location. Computational electronics unit 23 utilizes the relationship between raster spots 17 and projection axis 27 and the location of the excited photodetector 21 to calculate the position and orientation of raster projector 13 which has a fixed relation to the observer's head.

The present invention can be utilized to provide head position information for more than one observer by spectrally separating one or more of the primaries used to produce a color display to each observer and spectrally filtering the inputs to an additional detector array 31. Thus each observer requires his own projector, attached to his helmet, generating a scene spectrally distinct from the other observer's scene. The diodes 21 and 31 are necessarily selected or filtered such that each array responds to the spectral information provided only by one of the projectors. Each observer's head position is then determined as hereinabove described.

It is to be understood that the description contained herein, as well as the drawing, are merely illustrative and are not intended as limitations on the present invention which is subject to numerous modifications and adaptions without departing from the scope and principle thereof as set forth in the appended claims.

What is claimed is:

1. An apparatus for monitoring the head position and orientation of an observer while viewing a visual scene upon a spherical retroreflective screen, comprising:
   means for projecting said visual scene mounted on said observer's head;
   means for detecting said projected visual scene at a plurality of points on said spherical retroreflective screen, said detecting means having an electrical signal output corresponding to each of said points;
   computational means for correlating said detecting means output to said visual scene temporally, and for solving for head position and orientation, receiving input from said detecting means and said projecting means, and outputting a signal based thereon.

2. An apparatus according to claim 1, wherein said projecting means is a raster type projector having a projected rectangular display generated about an axis of projection by a moving raster spot, said spot having its origin at said projector on said axis of projection.

3. An apparatus according to claim 2, wherein said display is composed of continually changing raster frames which are in turn composed of a series of raster lines generated by said raster spot in accordance with a predetermined scan pattern such that each raster frame and raster line has an identifiable temporal beginning.

4. An apparatus according to claim 3, wherein said projected rectangular display fills a solid angle which is substantially smaller than said spherical retroreflective screen.

5. An apparatus according to claim 4, wherein said detecting means is an array of photodiodes each capable of detecting said raster spot, said photodiodes being physically spaced about said spherical retroreflective screen such that at least three of said photodiodes are within said projected display at any given time, each photodiode having an output corresponding to the detection of said raster spot.

6. An apparatus according to claim 1, wherein said detecting means is an array of discrete photodetectors, each capable of detecting said visual image independently.

7. An apparatus according to claim 6, wherein said photodetectors are photodiodes having a response time of 0.01 microseconds or less.

8. An apparatus according to claim 5 or 7, wherein said photodiodes are mounted behind said spherical retroreflective screen such that optical communication between said photodiodes and said projecting means is maintained via subresolution size apertures in said spherical screen.

9. An apparatus according to claim 8, further comprising:
   a second projecting means mounted on a second observer's head, said projecting means having a spectral variation in said visual screen;
   a second detecting means mounted in said retroreflective screen for detecting said spectrally varied visual scene, and outputting an electrical pulse corresponding to the detection of said visual scene to said correlating means.

10. An apparatus according to claim 1, wherein said computational means includes a programmable computer for solving for head position and orientation.

* * * * *